Figure 1:
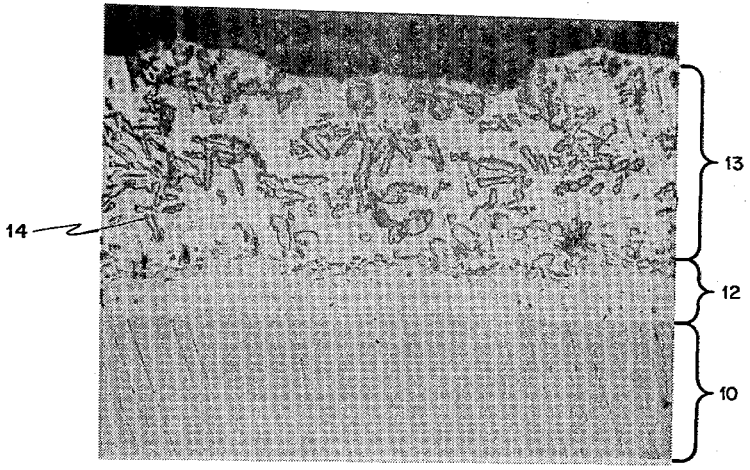

INVENTOR.
LAWRENCE SAMA

United States Patent Office 3,360,350
Patented Dec. 26, 1967

3,360,350
REFRACTORY METAL COMPOSITE AND
COATING COMPOSITION
Lawrence Sama, Seaford, N.Y., assignor to General
Telephone and Electronics Laboratories, Inc., a corporation of Delaware
Filed Nov. 29, 1963, Ser. No. 327,135
8 Claims. (Cl. 29—197)

This invention relates to protective coatings and in particular to oxidation-resistant coatings for use at elevated temperatures.

Refractory metals, such as tantalum, columbium, tungsten, and molybdenum are widely employed in components and devices which must withstand temperatures above 2000° F. without loss of strength. In particular, the rigorous heating environment encountered by missiles and spacecraft during reentry makes the use of refractory metals in these vehicles highly desirable. However, refractory metals oxidize rapidly at high temperatures and it has been found necessary to apply oxidation-resistant coatings to the surfaces of the metal.

One coating which has been used with some success consists of powdered tin mixed with aluminum and a low residue lacquer. This coating mixture is applied to the refractory metal base and the coated part then diffusion treated by firing in vacuum or an inert atmosphere. During the diffusion treatment, the aluminum in the blend reacts with the refractory metal to form an intermetallic compound layer covered by a layer of tin-rich tin-aluminum alloy. While this tin-aluminum coating provides good protection for refractory metals at elevated temperatures, it has two principal disadvantages. First, during the diffusion treatment the tin-rich layer becomes quite fluid and excess coating material flows down toward the bottom of the part forming an accumulation of coating material in the form of a tin-aluminum lump. Removal of the excess material impairs the protection afforded by the coating but is usually necessary to provide a uniformly coated part. Second, it is extremely difficult to control the thickness of the tin-aluminum layer. At elevated temperatures, the effectiveness of the coating is related to its thickness and therefore control of the coating thickness is highly desirable.

Accordingly it is an object of my invention to provide a coating for refractory metals having improved oxidation resistance at elevated temperatures.

Another object is to provide a coating for refractory metals having a thickness which can be controlled to obtain improved oxidation resistance.

Still another object is to provide a coating for refractory metals which is sufficiently viscous to prevent excessive flow while being applied to the metal.

In the present invention an oxidation-resistant coating composition for refractory metals is provided consisting essentially of a mixture of tin, aluminum, and a refractory metal additive selected from the group consisting of molybdenum, tantalum, tungsten and columbium. This mixture is applied to a refractory metal substrate and then fired to form a coating having a first layer affixed to the substrate consisting essentially of an aluminide of the base metal and a second layer covering the first layer consisting essentially of a tin-aluminum alloy containing dispersed particles of an aluminide of the refractory metal additive. The base metals employed are selected from the group consisting of molybdenum, tantalum, tungsten and columbium or alloys of these metals.

The resultant coating can be made considerably thicker and more uniform than tin-aluminum coatings which do not contain a refractory metal additive. In addition, the excess flow of coating material encountered during the diffusion treatment with previously known tin-aluminum coatings is eliminated. It is believed that the greater thickness, uniformity and resulting oxidation-resistance of the present coating results from a skeleton-like structure formed by the refractory metal aluminide particles dispersed throughout the tin-aluminum layer. While all of the refractory metal additives listed have proved highly effective, tantalum and molybdenum have been found to provide the best oxidation resistance.

Figure 2:
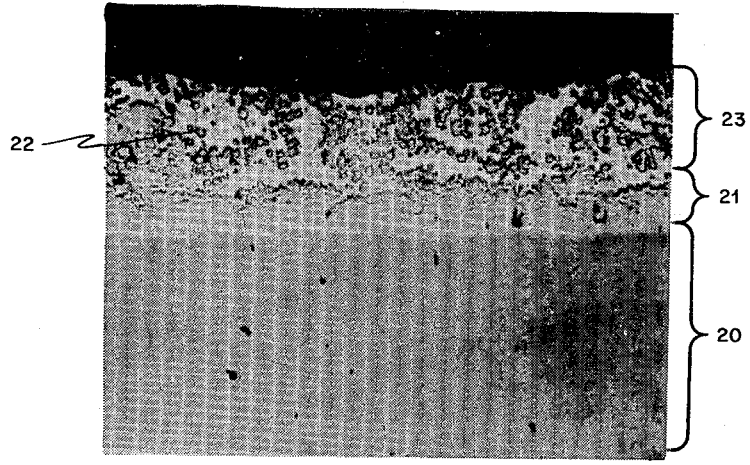

The above objects of and the brief introduction to the present invention will be more fully understood and further objects and advantages will become apparent from a study of the following description in connection with the drawing wherein:

FIG. 1 is a photomicrograph of a tantalum substrate protected by a coating containing molybdenum as a refractory metal additive, and FIG. 2 is a photomicrograph of a tantalum substrate protected by a coating containing tantalum.

Before applying the coating, the refractory metal substrate is prepared by degreasing with a suitable solvent such as trichlorethylene followed by blasting with steel grit particles. A coating mixture consisting essentially of 15 to 50 percent by weight of aluminum, 5 to 15 percent by weight of a refractory metal additive selected from the group consisting of molybdenum, tantalum, tungsten and columbium, and the balance tin is mixed with a low residue lacquer such as type L18 manufactured by Raffi & Swanson, Wilmington, Massachusetts to form a slurry. This slurry is then applied to the surface of the substrate by spraying, dipping, or painting, the low residue lacquer acting as a vehicle to assure good adherence of the coating to the substrate.

The proportion of lacquer to metal depends upon which application process is used. In cold spraying, the proportion of lacquer to metal is approximately one to one by volume, while for dipping or painting the lacquer-to-metal ratio is about one to two.

Alternatively, the tin and aluminum can be mixed with lacquer in the same ratio as above to form a first slurry and the refractive metal additive mixed with lacquer in a volume ratio of approximately one to twenty to form a second slurry, the first and second slurries being applied consecutively.

The coating is then dried in air and the coated part diffusion treated by firing in a vacuum furnace at a pressure of one micron or less and a temperature in the range 1800° F. to 1900° F. for between 15 and 60 minutes. While best results have been obtained by firing in vacuum, an inert atmosphere such as argon or helium may also be employed.

The coating and diffusion treatments may be repeated as often as necessary to build up the desired coating thickness. Two applications have been found to give optimum protection in most cases.

FIG. 1 is a photomicrograph showing the structure of a tantalum substrate 10 protected by a tin-aluminum-molybdenum coating. It was prepared by mixing tin and 25 percent by weight of aluminum with lacquer in a one to one volume ratio and spraying the mixture on the surface of the substrate. A second mixture consisting of molybdenum powder and lacquer in a one to twenty ratio was sprayed over the tin-aluminum layer, the amount of molybdenum being about 15 percent of the weight of the tin-aluminum layer. The coated substrate was then fired in vacuum at 1870° F. for one half hour. During the diffusion treatment an intermetallic compound layer of tantalum aluminide (TaAl$_3$) 12 was formed by reaction of the aluminum with the tantalum substrate 10. Layer 12 is covered by a tin-aluminum layer 13 containing particles 14 consisting essentially of a skeleton-like structure of molybdenum aluminide. The thickness of the tantalum aluminide layer 12 is about 1.25 mils and that of layer 13 about 4.5 mils.

FIG. 2 is a photomicrograph showing the structure of a tantalum substrate 20 protected by a tin-aluminum-tantalum coating. The coating was prepared in the same way as the coating of FIG. 1, the only difference being that tantalum powder was substituted for molybdenum. As shown, a layer of tantalum aluminide 21 is formed on the tantalum substrate and particles of tantalum aluminide 22 are dispersed throughout the tin-aluminum layer 23. Layer 21 is about 1.0 mil and layer 23 about 2.5 mils thick.

The percentage of refractory metal additive in the coatings shown in FIGS. 1 and 2 is higher than the optimum value, these photomicrographs having been used as illustrations because they best illustrate the coating structure.

Samples of substrates consisting of an alloy of tantalum with 10 percent by weight tungsten were protected with a conventional tin-aluminum coating and also by the tin-aluminum refractory metal coating of the present invention. The refractory metal coatings consisted of two applications of a single slurry having the compositions indicated in Table I. In testing these compositions, water-cooled electrodes were connected to each sample and the samples oxidized by heating to 3000° F. by an electric current until they failed. It shall be noted that the time to failure for the conventional tin-aluminum coating is considerably less than for coatings containing tantalum or molybdenum.

TABLE I

| Substrate | Coating Composition (Weight Percent) | Time to Failure (Min.) |
|---|---|---|
| Ta-10 W | Sn-25 Al | 9 |
| Ta-10 W | Sn-26 Al-7 Ta | 27 |
| Ta-10 W | Sn-27 Al-6 Mo | 35 |

A number of refractory metal substrates of different compositions were protected by tin-aluminum coatings containing various refractive metal additives and heated to failure in a furnace. The times to failure for typical test samples are shown in Table II.

TABLE II

| Substrate | Coating Composition (Weight Percent) | Test Temp. (° F.) | Time to Failure (Hours) |
|---|---|---|---|
| Ta-10 W | Sn-26 Al-7 Ta | 2,000 | 71 |
| Ta-10 W | Sn-27 Al-6 Mo | 2,000 | 100 |
| Ta-10 W | Sn-26 Al-7 Ta | 2,800 | 70 |
| Ta-10 W | Sn-27 Al-6 Mo | 2,800 | 73 |
| Ta-10 W | Sn-24 Al-9 Mo | 2,800 | 23 |
| Ta-10 W | Sn-26 Al-7 W | 2,800 | 23 |
| Ta-10 W | Sn-23 Al-9 W | 2,800 | 25 |
| Cb-1 Zr | Sn-25 Al-15 Ta | 2,000 | 480 |
| Cb-1 Zr | Sn-25 Al-15 Ta | 2,300 | 48 |
| Cb-1 Zr | Sn-25 Al-15 Mo | 2,000 | 552 |
| Cb-1 Zr | Sn-25 Al-15 Mo | 2,300 | 72 |
| W | Sn 27 Al-6 Mo | 1 3,000 | 1 |
| W | Sn-27 Al-6 Mo | 1 3,300 | 1 |
| W | Sn-27 Al-6 Mo | 1 3,450 | 1 |
| W | Sn-26 Al-7 Ta | 1 3,000 | 1 |
| W | Sn-26 Al-7 Ta | 1 3,300 | 1 |
| Mo-0.5 Ti-0.08 Zr | Sn-24 Al-3Si-5.5 Mo | 3,000 | 4 |
| Mo-0.5 Ti-0.08 Zr | Sn-24 Al-3Si-5.5 Mo | 2,600 | 12 |
| Mo-0.5 Ti-0.08 Zr | Sn-24 Al-3Si-5.5 Mo | 2,400 | 25 |
| Mo-0.5 Ti-0.08 Zr | Sn-24 Al-3Si-5.5 Mo | 1,600 | 48 |

1 Tests conducted with oxyacetylene torch.

The coatings applied to the Mo-0.5Ti-0.08Zr alloys tested in Table II contained small quantities of silicon because it was found that the addition of silicon improves the properties of coatings on this alloy at temperatures below 2500° F. However, good oxidation protection is obtained when the silicon is omitted.

The increase in the weight of various coatings by oxidation was measured as shown in Table III. It was found that the coating having the higher percentage of refractory metal additive oxidized at a higher rate than those having lower percentages of additive.

TABLE III

| Substrate | Coating Composition (Weight Percent) | Coating Weight (mg./cm.$^2$) | Test Temp. (° F.) | Test Time (Hrs.) | Coating Weight Gain (mg./cm.$^2$) |
|---|---|---|---|---|---|
| Ta-10 W | Sn-26 Al-7 Ta | 60 | 2,800 | 8 | 6.6 |
| Ta-10 W | Sn-26 Al-14 Ta | 89 | 2,800 | 8 | 12.6 |
| Ta-10 W | Sn-26 Al-7 Ta | 70 | 3,000 | 10 | 7.3 |
| Ta-10 W | Sn-26 Al-14 Ta | 88 | 3,000 | 10 | 12.0 |

As shown above, oxidation-resistant coatings which are readily applied and which afford excellent protection at high temperatures are obtained with coating mixtures consisting essentially of tin, aluminum and a refractory metal additive. Optimum oxidation resistance is obtained with approximately 25 percent aluminum, between 6 and 8 percent refractory metal additive and the balance tin.

As many changes could be made in the above described invention without departing from the scope thereof, it is intended that all matter contained therein shall be interpreted as illustrative and not in a limiting sense.

What is claimed is:

1. An oxidation-resistant coating composition for refractory metals consisting essentially of between 15 and 50 percent by weight aluminum, between 5 and 15 percent by weight of a refractory metal additive selected from the group consisting of molybdenum, tantalum, tungsten, and columbium, the balance of said coating being tin.

2. An oxidation-resistant coating composition for refractory metals consisting essentially of approximately 25 percent by weight aluminum, between 6 to 8 percent by weight of a refractory metal additive selected from the group consisting of molybdenum, tantalum, tungsten, and columbium, the balance of said coating being tin.

3. An oxidation-resistant coating composition for refractory metals consisting essentially of between 15 and 50 percent by weight aluminum, between 5 and 15 percent by weight tantalum, the balance of said coating being tin.

4. An oxidation-resistant coating composition for refractory metals consisting essentially of between 15 and 50 percent by weight aluminum, between 5 and 15 percent by weight molybdenum, the balance of said coating being tin.

5. An article comprising a refractory metal substrate having a coating thereon consisting essentially of between 15 and 50 weight percent aluminum, between 5 and 15 weight percent of a refractory metal additive selected from the group consisting of molybdenum, tantalum, tungsten and columbium, and 35 to 80 weight percent tin, said coating having a first layer affixed to said substrate consisting essentially of an aluminide of said refractory metal substrate, and a second layer affixed to said first layer consisting essentially of said 35 to 80 weight percent tin, dispersed particles of an aluminide of said 5 to 15 weight percent refractory metal additive, and the balance aluminum.

6. A coated article as defined by claim 5 wherein said refractory metal substrate consists of an alloy containing metals selected from the group consisting of molybdenum, tantalum, tungsten and columbium.

7. A coated article as defined by claim 5 wherein said refractory metal substrate consists essentially of tantalum, said first layer consists essentially of tantalum aluminide and the dispersed particles in said second layer consist essentially of molybdenum aluminide.

8. A coated article as defined by claim 5 wherein said refractory metal substrate consists essentially of tantalum, said first layer consists essentially of tantalum aluminide and the dispersed particles in said second layer consist essentially of tantalum aluminide.

References Cited

UNITED STATES PATENTS

| 1,421,471 | 7/1922 | Heskett. | |
|---|---|---|---|
| 2,711,973 | 6/1955 | Wainer. | |
| 2,772,985 | 12/1956 | Wainer | 29—198 |
| 2,967,351 | 1/1961 | Roberts | 75—.55 |

HYLAND BIZOT, *Primary Examiner.*